No. 884,812. PATENTED APR. 14, 1908.
H. G. GILLMOR & A. W. SWEET.
ROTARY MOTOR.
APPLICATION FILED FEB. 27, 1907.
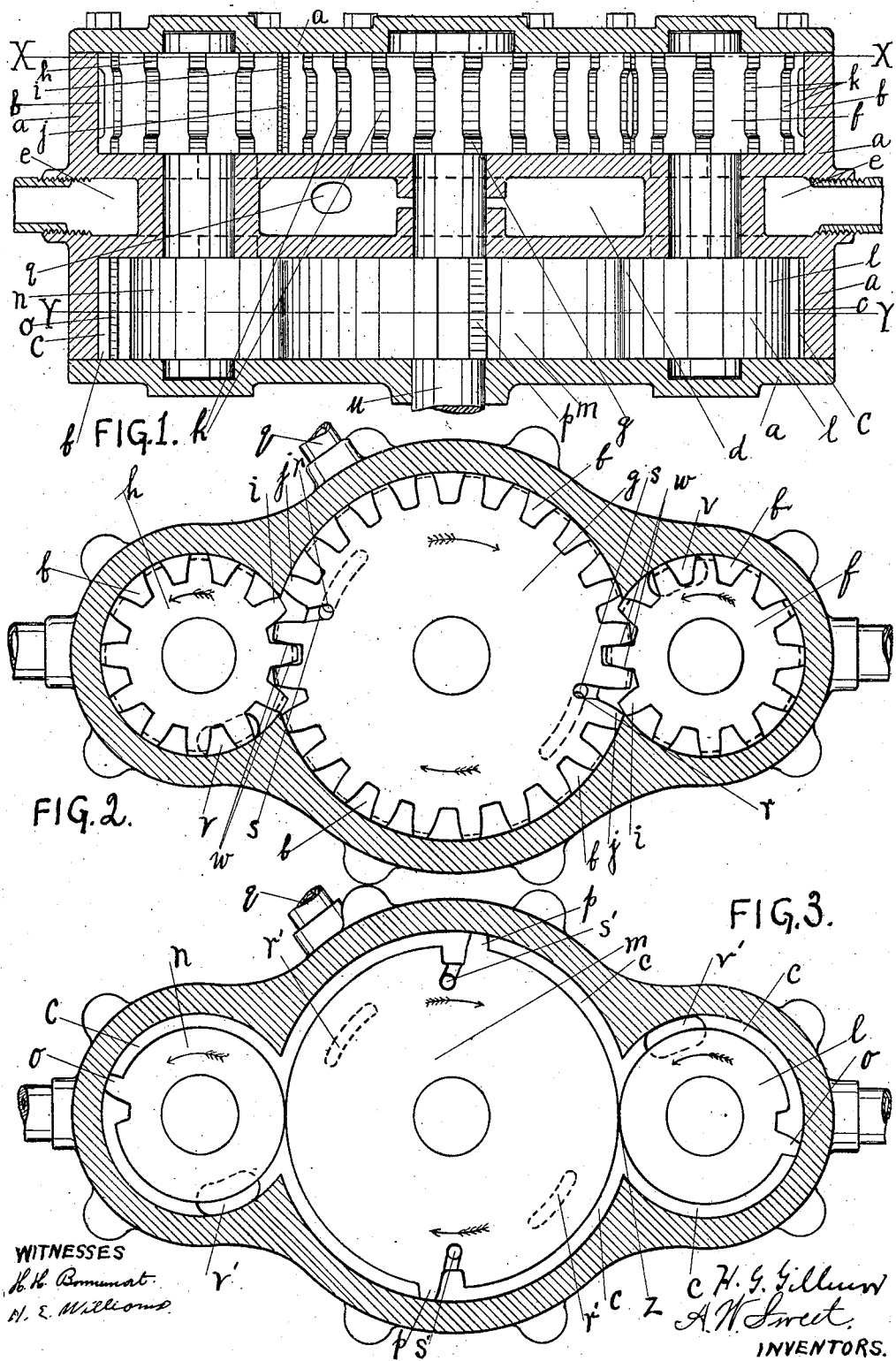
WITNESSES
INVENTORS.

UNITED STATES PATENT OFFICE.

HORATIO G. GILLMOR, OF BATH, AND ARTHUR W. SWEET, OF DURHAM, MAINE; SAID SWEET ASSIGNOR TO SAID GILLMOR.

ROTARY MOTOR.

No. 884,812.　　　Specification of Letters Patent.　　　Patented April 14, 1908.

Application filed February 27, 1907. Serial No. 359,674.

*To all whom it may concern:*

Be it known that we, HORATIO G. GILLMOR, a citizen of the United States, residing at Bath, in the county of Sagadahoc, State of Maine, and ARTHUR W. SWEET, a citizen of the United States, residing at Durham, in the county of Androscoggin, State of Maine, have invented an Improvement in Rotary Motors, of which the following is a specification, accompanied by drawings.

Our invention relates to rotary motors and one of the objects of our invention is to provide a motor of simple construction in which the working fluid may be employed expansively.

Another object of our invention is to secure uniformity in the driving effort and therefore in the angular velocity of the driving shaft.

Another object of our invention is to restrict the rate of revolution of the driving shaft while still providing for a large number of impulses per revolution of the driving shaft.

Further objects of our invention will hereinafter appear and to these ends the invention consists of a rotary motor for carrying out the above objects embodying the features of construction, combination of elements and arrangement of parts having the general mode of operation substantially as hereinafter described and claimed in this specification and shown in the accompanying drawings in which:

Figure 1 is a longitudinal section through the motor casing showing the moving parts. Fig. 2 is a transverse section of the casing at the plane indicated by XX in Fig. 1 looking toward the middle. Fig. 3 is a transverse section of the casing at the plane indicated by YY in Fig. 1 looking toward the middle.

Similar letters refer to similar parts throughout the several figures.

($a$) is a casing, the end portions of which ($b$) and ($c$), have intersecting cylindrical bores separated by walls from a pressure chamber or receiver ($d$) and exhaust chambers ($e$). Within the end space ($b$) there are placed, meshing with one another, the spur gear wheels ($f$), ($g$) and ($h$), the end faces of which fit closely against the end bounding walls of the space ($b$). The middle gear ($g$) of this set is provided with a number of teeth which is a multiple of the teeth of the pinions ($f$) and ($h$). The pinions ($f$) and ($h$) and the center gear have axles or shafts having suitable bearings concentric with the intersecting cylindrical bores of the space ($b$). Each pinion has one tooth ($i$), the end of which is composed of elements of the cylindrical bore of the part of the space ($b$) within which the pinion in question moves so that this tooth will move in contact with the bore of the corresponding part of the space ($b$). The center gear ($g$) has, separated from each other by a number of teeth corresponding to the number of teeth in the pinions, similar teeth ($j$), the end surfaces of which are elements of the cylinder of the larger bore of the space ($b$) so that these teeth will move in contact with the bore of the corresponding part of the space ($b$). The other teeth of both the pinions ($f$) and ($h$) and the gear ($g$) are shortened for the whole or part of their face length as shown at ($k$) and by the dotted lines in Fig. 2.

The axles or shafts of the pinions and of the center gear are prolonged as shown and upon them in the space ($c$) are secured disks ($l$), ($m$) and ($n$), the end faces of which fit accurately against the end walls of the space ($c$). The disks ($l$), ($m$) and ($n$) are true cylinders except that upon the disks ($l$) and ($n$) there are formed what would correspond to a single tooth ($o$) of a pinion having a pitch cylinder the same as the main cylindrical portion of the disks ($l$) and ($n$); and, upon the disks ($m$) there are formed, each distant from the other by an amount equal to the circumference of the pitch cylinder of either disks ($l$) or ($n$), what would correspond to teeth ($p$) of a gear wheel having a pitch cylinder the same as the main cylindrical portion of this disk ($m$). The cylindrical portions of the disks ($l$), ($m$) and ($n$) are of such diameters that they will roll upon one another; and, being secured upon the axles or shafts with the gears ($f$), ($g$) and ($h$), their motions will be the same as those of the gears ($f$), ($g$) and ($h$). The cylindrical portions will roll upon one another until a tooth ($o$) of one of the disks ($l$) or ($n$) meshes with a tooth ($p$) of the disk ($m$) when, surfaces of the teeth will have rolling contact with one another as in gear wheels having pitch cylinders of the same diameters as the diameters of the disks until the teeth have passed one another and then the cylindrical portions of the disks will again roll upon one another. The ends of the teeth ($o$) and ($p$) are formed with elements corresponding to the elements of the cylindrical bores of the spaces within which the parts move so that they will move in contact with these bores. (q) represents a pipe whereby the working fluid is introduced to the pressure chamber (d) and this space maintained under pressure, and (r) and (r') (shown dotted in Fig. 3) represent ports communicating between the pressure chamber (d) and the spaces (b) and (c). (s) represents passages formed in the gear (g) to admit the working fluid to the space (b) when the passages (s) over-travel the ports (r). (s') represents passages formed in the disk (m) which, when they over-travel the ports (r') admit working fluid to (c). (v) and (v') represent exhaust ports communicating freely with the exhaust spaces (e). The gears (f), (g) and (h) mesh at (w). The blanks are in rolling contact with one another at (z). (u) is a prolongation of the shaft or axle beyond the casing whereby the energy generated by the motor is transmitted for use.

Since the full length teeth (i) and (j) move as revolving pistons within the bores of the corresponding space and the gears mesh at (w), there is inclosed by the casing, the gears meshed at (w), and the teeth (i) and (j) a volume which increases as the teeth (i) and (j) separate and diminish as they approach one another. In the same way a varying volume is inclosed between the casing, the disks rolling upon one another at (z), and the teeth (o) and (p). The positions of the ports (r) and the passages (s) are so arranged that when two teeth (i) and (j) are both in contact with the bores of the parts of (b) within which they move the passage (s) will over-travel the port (r) and admit working fluid to the space between the casing, the teeth (i) and (j) and the meshed teeth at (w). The pressure of the working fluid upon the teeth (i) and (j) will force them apart, the spaces at the other sides of (i) and (j) being in communication with the exhaust through the exhaust port (v). The gears (f), (g) and (h) are therefore caused to revolve. Working fluid will continue to be admitted until, by the movement of (g), the passage (s) formed in (g) passes beyond the port (r) when admission of the working fluid is cut off. The working fluid then contained between the casing, the teeth (i) and (j) and the meshed teeth at (w) will thereafter work by expanding until the teeth (i) over-travel the exhaust port (v). Similarly the positions of the ports (r') and the openings (s') in the disks (m) are so arranged that, when the teeth (o) and (p) of the disks (l) and (m) or (n) and (m) are both in contact with the bores of the parts of (c) within which they move, the opening (s') of the disk (m) will over-travel the port (r') and admit working fluid to the spaces contained between the casing, the teeth (o) and (p) and the line of contact of the rolling disks at (z) the spaces at the other sides of (o) and (p) being in communication with the exhaust through the exhaust ports (v'). The working fluid is admitted to, cut off from and expanded in the space (c) as just described for the space (b).

Figs. 2 and 3 show the relative positions of the teeth forming the rotating pistons. In Fig. 2 it will be seen that the gear wheel (g) has reached a position at which the long teeth (j) are in contact with the bores of the corresponding parts of the casing and the teeth (i) of the pinions have just begun to come into contact with the bore to which they correspond. In this position the passages (s) are just beginning to over-travel the ports (r) and admission of working fluid has begun. Admission of the working fluid will continue until the passage (s) passes beyond the port (r) when admisssion of the working fluid will be cut off and the fluid contained within the spaces bounded by the casing, the gears mesh at (w), and the teeth (i) and (j) will expand doing work until the teeth (i) on the pinions over-travel the exhaust ports. The relative positions of the teeth (o) and (p) are such that as the exhaust is about to take place in the geared portion of the motor the teeth (o) and (p) will be just beginning to separate with their points in contact with the bores of the spaces within which they move and the passages (s') of the disk (m) just beginning to over-travel the ports (r') to admit working fluid and admission of working fluid to this portion of the motor will continue until the passages (s') pass beyond the ports (r') when admission of the working fluid will be cut off and the contained fluid will thereafter expand doing work until the teeth (o) over-travel the exhaust port just prior to which the ports (s) in the gear (g) will admit working fluid to the geared portion of the motor. It will be seen, therefore, that, with this arrangement, there will be no time; during which, so long as working fluid under pressure is supplied to the pressure chamber an effort of the working fluid will not be exerted upon the moving parts of the motor. A uniform driving effort will therefore be exerted.

In the drawings the center gear and the center disk have been shown for simplicity of twice the pitch diameter of either pinion. They might be made to bear any other desired relation to the pinions so long as the diameters of their pitch cylinders are multiples of the diameters of the pitch cylinders of the pinions or small disk, and as many long teeth or working teeth are employed as would be represented by the ratio of the pitch circle of the gear or center disk to either pinion or the side disk. It will be understood also that a motor might be constructed employing gears at both sides of the pressure chamber or receiver (d) and that a motor might be constructed making use of only three gears in connection with a pressure chamber (d) and the necessary ports and passages. A motor might also be constructed making use only of the disks with their motions controlled by means of suitable gears or other devices external to the working space of the motor. It will be understood also that valves might be formed separately from the gears or disks for controlling the admission and cut-off of the working fluid instead of making a gear or disk perform the function of a valve.

Obviously some features of the invention may be used without others and the invention may be embodied in widely varying forms; therefore, without limiting the invention to the constructions shown or described nor enumerating equivalents, we claim and desire to secure by Letters Patent the following:

1. A motor comprising a casing having intersecting cylindrical bores; gear wheels, constructed with teeth of uniform pitch meshing with and rolling upon one another at points of contact, adapted to move within the said cylindrical bores upon axes coinciding with the axes of the several bores, a tooth at even multiples of the uniform pitch of said teeth, being formed upon each gear to move in contact with the cylindrical bore of that portion of the casing within which the said gear wheel moves and all other teeth being shortened to prevent contact with said cylindrical bore; and means whereby the admission of working fluid to and exhaust of the same from the said motor are suitably controlled; for substantially the purposes set forth.

2. A motor comprising a casing having intersecting cylindrical bores; gear wheels meshing with one another constructed to move within the said cylindrical bores upon axes coinciding with the axes of the several bores, one or more of the teeth upon each gear wheel being formed to move in contact with the cylindrical bore of that portion of the casing within which the said gear wheel moves; and means for suitably controlling the admission of working fluid to and the exhaust of the same from the said motor comprising a suitable admission port in the said casing; a passage constructed in one of the said gear wheels so arranged as to over-travel the said port to admit working fluid to and cut off the same from the said motor in proper sequence and an exhaust port communicating freely between a portion of the interior of the said casing and the exhaust passages from the said motor; for substantially the purposes set forth.

3. A motor comprising a casing having intersecting cylindrical bores; gear wheels meshing with one another constructed to move within the said cylindrical bores upon axes coinciding with the axes of the said bores, one or more of the teeth upon each of the said gear wheels being formed to move in contact with the cylindrical bore of that portion of the casing within which the said gear wheel moves; and means for suitably controlling the admission of working fluid to and the exhaust of working fluid from the said motor comprising suitable admission ports in the said casing, passages constructed in one of the said gear wheels so arranged as to over-travel the said ports to admit and cut off the working fluid in proper sequence, and exhaust ports communicating freely between a part of the interior of the said casing and the exhaust passages from the motor; for substantially the purposes set forth.

4. A motor comprising a casing having three intersecting cylindrical bores; three gear wheels constructed with teeth of uniform pitch meshing with and rolling upon one another at points of contact, adapted to move within said cylindrical bores upon axes coinciding with the axes of the several bores, teeth at even multiples of uniform pitch of said teeth being formed upon each gear to move in contact with the cylindrical bore of that portion of the casing within which said gear wheel moves and all other teeth being shortened to prevent contact with said cylindrical bore; and means whereby the admission of working fluid to and exhaust of the same from said motor are suitably controlled for substantially the purposes set forth.

5. A motor comprising a casing having three cylindrical bores; three gear wheels meshing with one another constructed to move within the said cylindrical bores upon axes coinciding with the axes of the several bores, one or more of the teeth upon each gear wheel being formed to move in contact with the cylindrical bore of that portion of the casing within which the said gear wheel moves; means for suitably controlling the admission of working fluid to and exhaust of working fluid from the said motor comprising suitable admission ports in the said casing, passages constructed in one of the said gears so arranged as to over-travel the said ports to admit and cut off the working fluid in proper sequence and exhaust ports communicating freely between a portion of the interior of the said casing and the exhaust passages of the motor; for substantially the purposes described.

6. A motor comprising a casing having three intersecting cylindrical bores, the diameter of one of which is greater than that of either of the other two; three gear wheels meshing with one another constructed to move within the said cylindrical bores upon axes coinciding with the axes of the said bores, one of the teeth upon each of the smaller gear wheels and a number of teeth equal to the ratio of the diameter of the pitch cylinder of the larger gear wheel to the diameter of the pitch cylinder of either of the smaller gear wheels upon the said larger gear wheel being formed to move in contact with the cylindrical bore of the several portions of the casing within which the said gear wheels severally move; and means whereby the admission of working fluid to and the exhaust of same from the said motor are suitably controlled; for substantially the purposes set forth.

7. A motor comprising a casing having three intersecting cylindrical bores, the diameter of one of the said bores being greater than the diameter of either of the other two of the said bores; three gear wheels meshing with one another constructed to move within the said cylindrical bores upon axes coinciding with the axes of the several bores, one of the teeth upon each of the smaller gear wheels and a number of teeth upon the larger gear wheel equal to the ratio of the diameter of the pitch cylinder of that gear wheel to the diameter of the pitch cylinder of either of the smaller gear wheels being formed to move in contact with the cylindrical bores of that portion of the casing within which the said gear wheels severally move; and means for suitably controlling the admission of working fluid to and the exhaust of working fluid from the said motor comprising suitable admission ports in the said casing, passages constructed in the said larger gear so arranged as to over-travel the said ports to admit and cut off the working fluid in proper sequence, and exhaust ports communicating freely between a portion of the space within the said casing and the exhaust passages of the motor; for substantially the purposes set forth.

8. A motor comprising a casing having intersecting cylindrical bores; disks constructed to move in rolling contact within the said casing upon axes coincident with the axes of the several bores, said disks being formed with projections constructed to move in contact with the bores of the several portions of the casing within which the several disks move and adjacent recesses the bounding surfaces of which projections and recesses correspond to the surfaces of teeth of gear wheels having pitch cylinders the same as the diameters of the several disks, whereby the said projections in passing one another have surfaces in rolling contact; means of controlling the relative movement of the several disks; and means whereby the admission of working fluid to and the exhaust of the same from the said motor are suitably controlled; for substantially the purposes set forth.

9. A motor comprising a casing having intersecting cylindrical bores; disks constructed to move in rolling contact within the said casing upon axes coinciding with the axes of the several bores, said disks being formed with projections constructed to move in contact with the bores of the portions of the casing within which said disks move and adjacent recesses, the bounding surfaces of which projections and recesses correspond to the surfaces of teeth of gear wheels having pitch cylinders the same as the diameters of said disks, whereby said projections in passing one another have surfaces in rolling contact; means for controlling the relative movements of said disks; and means for suitably controlling the admission of working fluid to and the exhaust of the same from said motor, comprising a suitable admission port in said casing; a passage constructed in one of the said disks so arranged as to over-travel said port to admit and cut off said fluid in proper sequence, and an exhaust port communicating freely between a portion of the space within the casing and the exhaust passages; for substantially the purposes set forth.

10. A motor comprising a casing having intersecting cylindrical bores; disks constructed to move in rolling contact within the said casing upon axes coincident with the axes of the several bores, said disks being formed with projections constructed to move in contact with the bores of the several portions of the casing within which the several disks move and adjacent recesses the bounding surfaces of which projections and recesses correspond to the surfaces of teeth of gear wheels having pitch cylinders the same as the diameters of the several disks, whereby the said projections in passing one another have surfaces in rolling contact; means for controlling the relative movements of the several disks; and means for suitably controlling the admission of working fluid to and the exhaust of same from the said motor comprising suitable admission ports in the said casing, passages constructed in one of the said disks so arranged as to over-travel the said ports to admit and cut off the working fluid in proper sequence, and exhaust ports communicating freely between a portion of the interior of the said casing and the exhaust passages; for substantially the purposes set forth.

11. A motor comprising a casing having three intersecting cylindrical bores; three disks constructed to move in rolling contact within the said casing upon axes coincident with the axes of the several bores, the said disks being formed with projections constructed to move in contact with the bores of the several portions of the casing within which the several disks move and suitable recesses to permit the passing of the corresponding projections of adjacent disks; means for controlling the relative movement of the several disks; and means whereby the admission of working fluid to and the exhaust of the same from the said motor are suitably controlled; for substantially the purposes set forth.

12. A motor comprising a casing having three intersecting cylindrical bores; three disks constructed to move in rolling contact within the said casing upon axes coincident with the axes of the several bores, the said disks being formed with projections constructed to move in contact with the bores of the several portions of the casing, within which the several disks move and suitable recesses to permit the passing of the corresponding projections of adjacent disks; means of controlling the relative movement of the several disks; and means for suitably controlling the admission of working fluid to and exhaust of the same from the said motor comprising suitable admission ports in the said casing, passages constructed in one of the said disks so arranged as to over-travel the said admission ports to admit and cut off the working fluid in proper sequence, and exhaust ports communicating freely between portions of the interior of the said casing and the exhaust passages of the motor; for substantially the purposes set forth.

13. A motor comprising a casing having three intersecting cylindrical bores the diameter of one of which is greater than the diameter of the other two; three disks constructed to move in rolling contact within the said casing upon axes coincident with the axes of the several bores, the diameter of the rolling contact portion of the larger of the said disks being a multiple of the diameter of the rolling contact portion of either of the smaller disks, the said disks being formed with projections constructed to move in contact with the bores of the several portions of the casing within which the several disks move and suitable recesses to permit the passing of the corresponding projections of adjacent disks; means for controlling the relative movement of the several disks; and means whereby the admission of working fluid to and the exhaust of the same from the said motor are suitably controlled; for substantially the purposes set forth.

14. A motor comprising a casing having three intersecting cylindrical bores the diameter of one of which is greater than the diameter of the other two; three disks constructed to move in rolling contact within the said casing upon axes coinciding with the axes of the several bores, the diameter of the rolling contact portion of the larger of the said disks being a multiple of the diameter of the rolling contact portion of either of the smaller disks, the said disks being formed with projections constructed to move in contact with the bores of the several portions of the casing within which the said disks move and suitable recesses to permit the passage of the corresponding projections of adjacent disks; means to control the relative movement of the several disks; and means for suitably controlling the admission of working fluid to and the exhaust of the working fluid from the said motor comprising suitable admission ports in the said casing, passages constructed in the largest of the said disks so arranged as to over-travel the said ports and admit and cut off the working fluid in proper sequence, and exhaust ports communicating freely between portions of the interior of the casing and the exhaust passages of the said motor; for substantially the purposes set forth.

15. A motor comprising a casing having a plurality of working chambers each constructed with intersecting cylindrical bores of two diameters; a single rotating piston moving within the smaller cylindrical bores; a plurality of rotating pistons moving within the larger cylindrical bores; means for suitably controlling the relative movements of said rotating pistons; and means whereby the admission of working fluid to and the exhaust of the same from said motor are suitably controlled; for substantially the purposes set forth.

16. A motor comprising a casing having a central pressure chamber, separated by walls constructed with suitable ports, from end chambers, each having intersecting cylindrical bores; rotating pistons moving within the several cylindrical bores; means for controlling the admission of working fluid to and the exhaust of the same from the working spaces of the said motor comprising passages formed in parts of rotating pistons constructed to over-travel the ports in the walls separating the pressure chamber from the working chambers and exhaust ports communicating freely between portions of the working chambers and the exhaust passages of the said motor; and means whereby the relative movements of the several rotating pistons are suitably controlled; for substantially the purposes set forth.

17. A motor comprising a casing having a plurality of separate working chambers, each constructed with three intersecting cylindrical bores, one of which is larger in diameter than the other two; a single rotating piston moving within each of the smaller cylindrical bores; a plurality of working pistons moving within the larger cylindrical bores; means for suitably controlling the movements of said rotating pistons; and means whereby the admission of working fluid to and the exhaust of the same from said motor are suitably controlled; for substantially the purposes set forth.

18. A motor comprising a casing having a central pressure chamber, separated by walls constructed with suitable ports, from end working chambers, each having three intersecting cylindrical bores; rotating pistons moving within the intersecting cylindrical bores of each working chamber; means for controlling the admission of working fluid to and the exhaust of the same from the working space of the said motor comprising passages formed in parts of the rotating piston constructed to over-travel the ports in the walls separating the pressure chamber from the working chambers and exhaust ports communicating freely between portions of the working chambers and exhaust passages of the said motor; and means whereby the relative movements of the said parts are suitably controlled; for substantially the purposes set forth.

In testimony whereof we have signed these specifications in the presence of two subscribing witnesses.

H. G. GILLMOR.
A. W. SWEET.

Witnesses:
H. H. BONNEMORT,
H. E. WILLIAMS.